US012603372B2

(12) United States Patent
Kim et al.

(10) Patent No.: US 12,603,372 B2
(45) Date of Patent: *Apr. 14, 2026

(54) FIXING STRUCTURE FOR A BATTERY RACK, ENERGY STORAGE SYSTEM, AND POWER GENERATION SYSTEM

(71) Applicant: LG ENERGY SOLUTION, LTD., Seoul (KR)

(72) Inventors: Hee-Chan Kim, Daejeon (KR); Kyung-Min Lee, Daejeon (KR); Seung-Jun Lee, Daejeon (KR); Kown Son, Daejeon (KR); Goan-Su Jung, Daejeon (KR); Jong-Soo Lee, Daejeon (KR); Seung-Joon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 501 days.

This patent is subject to a terminal disclaimer.

(21) Appl. No.: 18/026,554

(22) PCT Filed: Sep. 28, 2021

(86) PCT No.: PCT/KR2021/013280
§ 371 (c)(1),
(2) Date: Mar. 15, 2023

(87) PCT Pub. No.: WO2022/065995
PCT Pub. Date: Mar. 31, 2022

(65) Prior Publication Data
US 2023/0335847 A1 Oct. 19, 2023

(30) Foreign Application Priority Data

Sep. 28, 2020 (KR) ........................ 10-2020-0126283

(51) Int. Cl.
*H01M 50/242* (2021.01)
*H01M 50/209* (2021.01)
*H01M 50/262* (2021.01)

(52) U.S. Cl.
CPC ....... *H01M 50/242* (2021.01); *H01M 50/209* (2021.01); *H01M 50/262* (2021.01)

(58) Field of Classification Search
None
See application file for complete search history.

(56) References Cited

U.S. PATENT DOCUMENTS

2002/0086202 A1    7/2002   Stone et al.
2005/0259404 A1    11/2005  Marraffa
(Continued)

FOREIGN PATENT DOCUMENTS

CN    109649214 A    4/2019
CN    209418578 U    9/2019
(Continued)

OTHER PUBLICATIONS

International Search Report for PCT/KR2021/013280 (PCT/ISA/210) mailed on Jan. 24, 2022.
(Continued)

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A battery rack includes a plurality of battery modules arranged in one direction; and a rack case configured to accommodate the plurality of battery modules. The rack case includes a fixing unit including a main body part of a plate shape provided on a lower end portion of the rack case, and a fixing groove formed to be recessed from an edge of the main body part.

12 Claims, 8 Drawing Sheets

(56)                    References Cited

U.S. PATENT DOCUMENTS

| | | | |
|---|---|---|---|
| 2005/0281002 A1 | 12/2005 | Miller | |
| 2006/0152906 A1 | 7/2006 | Miller | |
| 2013/0316212 A1* | 11/2013 | Lee | H01M 50/291 |
| | | | 429/99 |
| 2014/0134460 A1 | 5/2014 | Youn | |
| 2015/0303421 A1 | 10/2015 | Tazawa et al. | |
| 2016/0174400 A1 | 6/2016 | Nakano et al. | |
| 2017/0125772 A1 | 5/2017 | Leung et al. | |
| 2017/0331166 A1 | 11/2017 | Hasegawa | |
| 2020/0161612 A1 | 5/2020 | Lee et al. | |
| 2021/0013466 A1 | 1/2021 | Lee et al. | |

FOREIGN PATENT DOCUMENTS

| | | | | | |
|---|---|---|---|---|---|
| CN | 110892549 A | 3/2020 | | | |
| JP | 59-173971 A | 10/1984 | | | |
| JP | 7-2095 A | 1/1995 | | | |
| JP | 2001-15090 A | 1/2001 | | | |
| JP | 3430039 B2 | 7/2003 | | | |
| JP | 2004-273428 A | 9/2004 | | | |
| JP | 4711308 B2 | 6/2011 | | | |
| JP | 2012-84486 A | 4/2012 | | | |
| JP | 2015-204262 A | 11/2015 | | | |
| JP | 2016-112629 A | 6/2016 | | | |
| JP | 2019-207847 A | 12/2019 | | | |
| JP | 6729689 B2 | 7/2020 | | | |
| KR | 10-2000-0038535 A | 7/2000 | | | |
| KR | 20000038535 A | * | 7/2000 | | G02F 1/133308 |
| KR | 10-0896769 B1 | 5/2009 | | | |
| KR | 10-2014-0061212 A | 5/2014 | | | |
| KR | 10-1481781 B1 | 1/2015 | | | |
| KR | 10-1581660 B1 | 1/2016 | | | |
| KR | 10-2017-0073393 A | 6/2017 | | | |
| KR | 10-1826933 B1 | 2/2018 | | | |
| WO | WO 2017/037999 A1 | 3/2017 | | | |
| WO | WO 2020/149545 A1 | 7/2020 | | | |

OTHER PUBLICATIONS

Extended European Search Report for European Application No. 21873023.2, dated Jul. 17, 2024.

* cited by examiner

100

200

FIXING STRUCTURE FOR A BATTERY RACK, ENERGY STORAGE SYSTEM, AND POWER GENERATION SYSTEM

TECHNICAL FIELD

The present disclosure relates to a battery rack, an energy storage system, and a power generation system, and more particularly, to a battery rack that is easy to install, an energy storage system, and a power generation system.

The present application claims priority to Korean Patent Application No. 10-2020-0126283 filed on Sep. 28, 2020 in the Republic of Korea, the disclosure of which is incorporated herein by reference.

BACKGROUND ART

Currently commercialized secondary batteries include nickel cadmium batteries, nickel hydrogen batteries, nickel zinc batteries, lithium secondary batteries, etc. Among these secondary batteries, because the lithium secondary batteries have almost no memory effect compared to nickel-based secondary batteries, the lithium secondary batteries have been spotlighted owing to advantages of free charging and discharging, a very low self-discharge rate, and a high energy density.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the assembly together with an electrolyte solution.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, as the need for a large-capacity structure, including its use as an energy storage source, recently increases, demand for a battery rack including a plurality of secondary battery cells electrically connected in series and/ or parallel, a battery module accommodating the plurality of secondary battery cells therein, and a battery management system (BMS) is increasing.

In addition, it was common for such a battery rack to include a rack case made of a metal material to protect or store a plurality of battery modules from external impact. Moreover, as the demand for a high-capacity battery rack is increasing recently, the demand for a battery rack in which a plurality of battery modules of a heavy load is accommodated is increasing.

However, it was very difficult to accurately position the battery rack of heavy load at a fixing point of an installation site. That is, it was inevitable to move the battery rack of heavy load using transportation equipment, and, when such transportation equipment is used, it was not easy to precisely adjust the position of the battery rack. Accordingly, an arrangement between battery racks is not even, which may cause a problem in that an electrical connection between the battery racks, or a connection of a firefighting facility, etc. may not be smooth.

DISCLOSURE

Technical Problem

The present disclosure is designed to solve the problems of the related art, and therefore the present disclosure is directed to providing a battery rack that is easy to install, an energy storage system, and a power generation system.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery rack including a plurality of battery modules arranged in a first direction; and a rack case configured to accommodate the plurality of battery modules, wherein the rack case includes a fixer provided on a lower end portion of the rack case, wherein the fixer includes a main body part having a plate shape, and wherein the main body part includes a fixing groove formed to be recessed in a second direction from an edge of the main body part.

The rack case may include a shelf frame configured to mount the plurality of battery modules; a front frame coupled to a front end of the shelf frame; and a rear frame coupled to a rear end of the shelf frame.

Each of the front frame and the rear frame may include a plurality of pillar portions extending long in the first direction; and a connector extending in a horizontal direction to connect upper portions of the plurality of pillar portions, and the main body part may extend in the horizontal direction to connect lower end portions of the plurality of pillar portions.

The fixing groove may include a taper portion having a width that is gradually reduced in the second direction, and an accommodation portion further recessed in the second direction from the taper portion.

The fixer may include a restraining bar configured to protrude into the fixing groove to partition between the taper portion and the accommodation portion; and an accommodation groove having an internal space to accommodate at least a part of the restraining bar.

The fixer may include an elastic member provided in the accommodation groove and configured to pressurize the restraining bar to protrude from the accommodation groove.

Each of the front frame and the rear frame may include a bracket including a horizontal section mounted on the fixer and including a slit groove having a shape corresponding to the fixing groove, and a vertical section having a shape bent and extending in the first direction from an end portion of the horizontal section and configured to be bolt-fastened to a pillar portion of the plurality of pillar portions.

The fixer may further include a guide extending outwardly from the edge of the main body part in the second direction so as to guide a movement of the fixer.

The guide unit may be bent upward at a predetermined angle, and include an extension groove formed to be recessed from a protruding and extending edge.

In another aspect of the present disclosure, there is provided an energy storage system including at least one battery rack described above.

The energy storage system may further include two or more battery racks stacked in an the first direction, among the two or more battery racks, a first battery rack located below a second battery pack may include a bolt hole formed in an upper portion of the rack case; and a bolt fixed to the bolt hole, and the bolt fixed to the bolt hole may be configured to be inserted into the fixing groove of the second battery pack.

In another aspect of the present disclosure, there is provided a power generation system including at least one battery rack described above.

Advantageous Effects

According to an aspect of the present disclosure, the present disclosure includes the fixing groove in the fixing unit of each of the front frame and the rear frame, thereby stably fixing the battery rack to the bottom of the storage place. In addition, the present disclosure may stably fix the battery rack to the bottom of the transport device, thereby stably maintaining a fixed state even when an external impact occurs during transport. In addition, present disclosure may facilitate fixing the battery rack to the installation place.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE OF DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
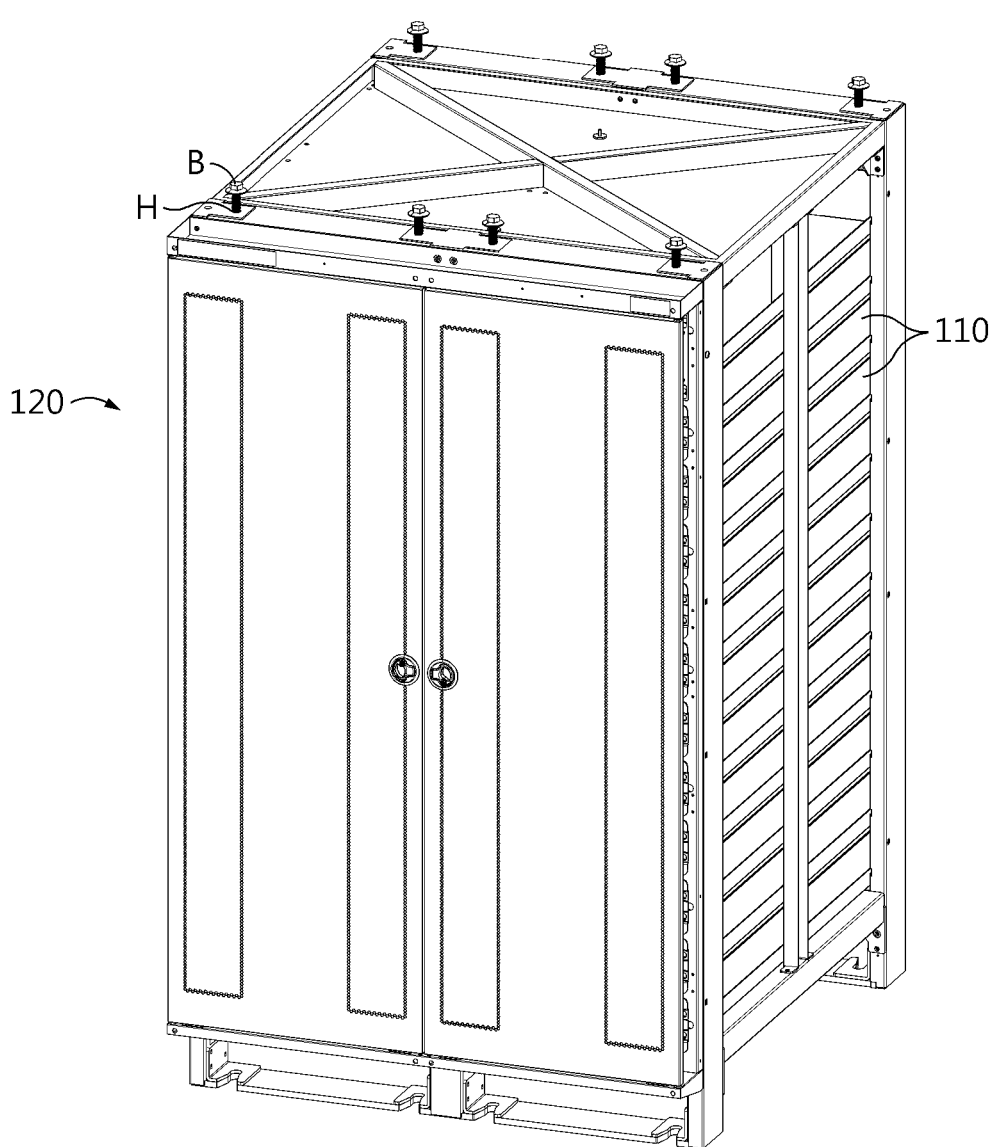
FIG. 1 is a perspective view schematically illustrating a battery rack according to an embodiment of the present disclosure.
Figure 2:
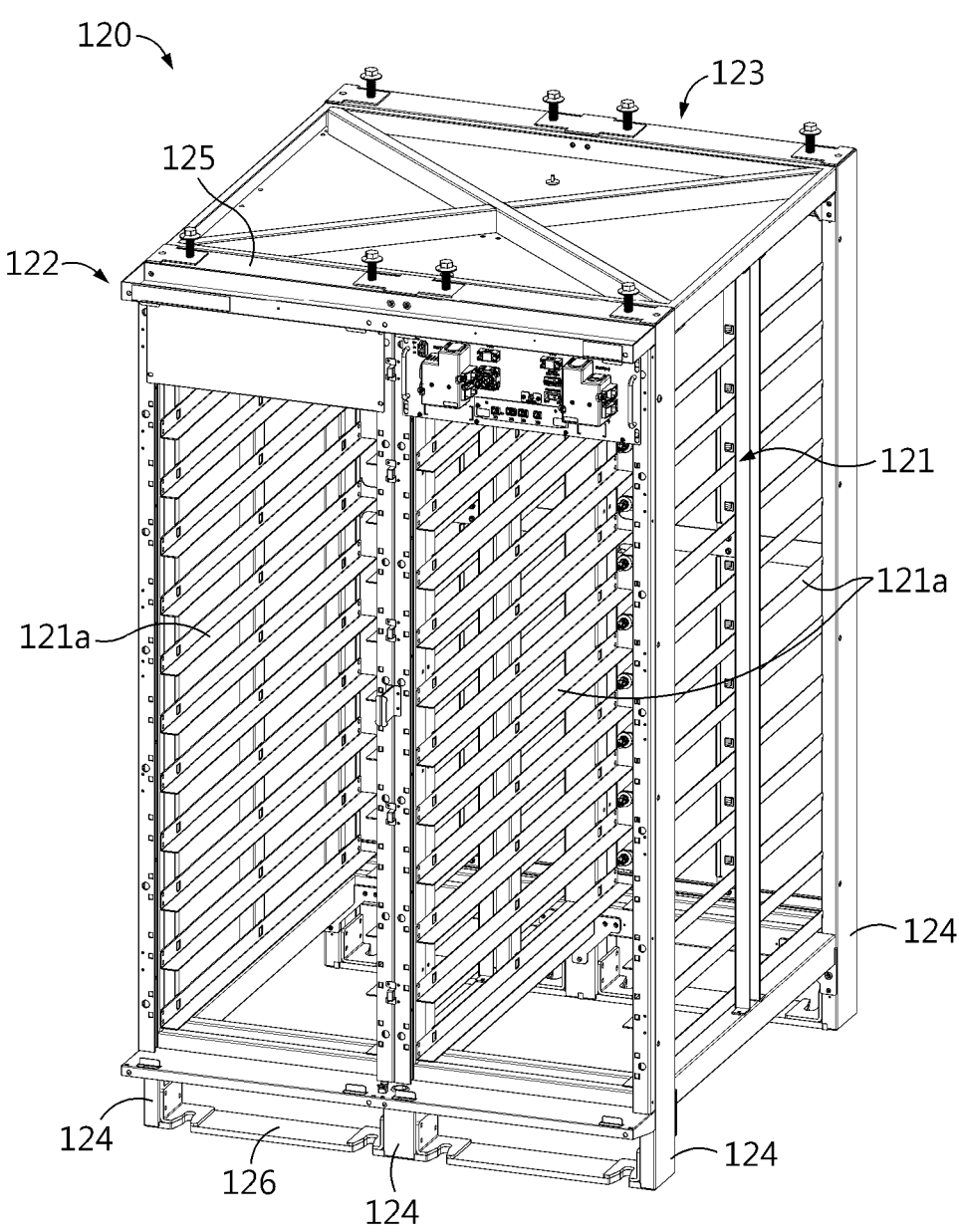
FIG. 2 is an exploded perspective view schematically illustrating a rack case of a battery rack according to an embodiment of the present disclosure.
Figure 3:
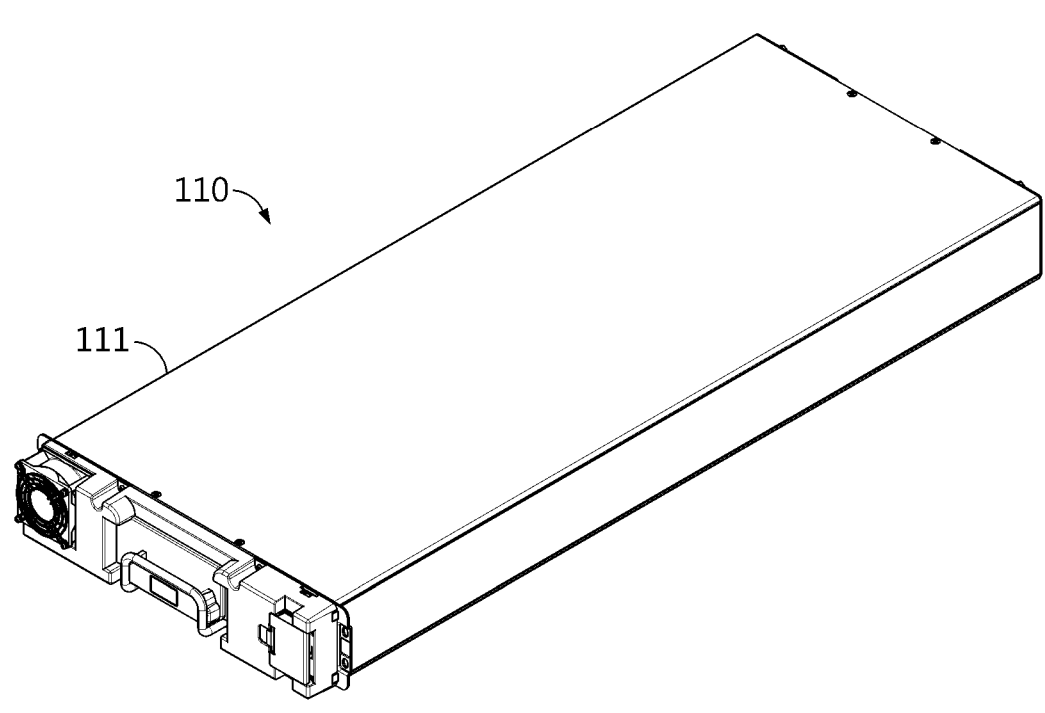
FIG. 3 is a perspective view schematically illustrating a rack module of a battery rack according to an embodiment of the present disclosure.

FIG. 1 is a perspective view schematically illustrating a battery rack according to an embodiment of the present disclosure. FIG. 2 is an exploded perspective view schematically illustrating a rack case of the battery rack according to an embodiment of the present disclosure. FIG. 3 is a perspective view schematically illustrating a rack module of the battery rack according to an embodiment of the present disclosure. For reference, in FIG. 2, a front door of the rack case was removed so that the inside of the battery rack may be viewed.

Referring to FIGS. 1 to 3, a battery rack 100 according to an embodiment of the present disclosure includes a plurality of battery modules 110, and a rack case 120 configured to accommodate the plurality of battery modules 110.

Specifically, the plurality of battery modules 110 may be accommodated in the rack case 120 so as to be arranged in an up-down direction. The battery module 110 may include a module housing 111 and a plurality of battery cells (not shown) provided inside the module housing 111 and stacked in one direction. For example, the battery cell may be a pouch-type battery cell.

However, the battery cell of the battery module 110 according to the present disclosure is not limited to the pouch-type battery cell described above, and various battery cells known at the time of filing of the present disclosure may be employed.

The rack case 120 may include a fixing unit 126 provided on a lower end of the rack case 120. The fixing unit 126 may include a main body part 126b of a plate shape. The main body part 126b may include a fixing groove 126h formed to be recessed from an edge of the main body part 126b.

Figure 4:
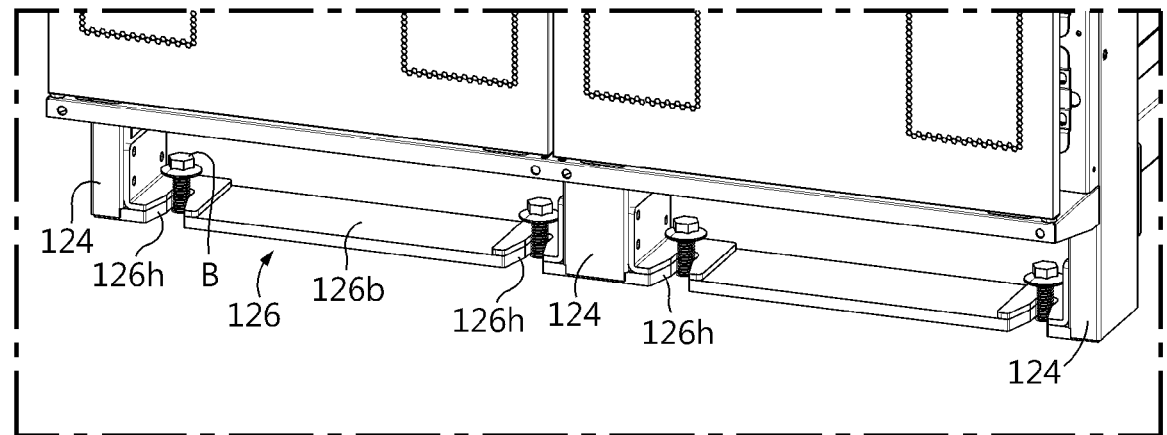
FIG. 4 is a partial perspective view schematically illustrating the front of the battery rack of FIG. 1.

Meanwhile, the rack case 120 may include a shelf frame 121, a front frame 122, and a rear frame 123. For example, as shown in FIGS. 2 and 4, the shelf frame 121 may be configured to mount the plurality of battery modules 110. Specifically, the shelf frame 121 may include a plurality of receiving plates 121a. The receiving plate 121a may have an shape and a plate shape bent at an angle of approximately 90 degrees. In addition, both ends of the receiving plate 121a in a front-rear direction may be configured to be respectively connected to the front frame 122 and the rear frame 123.

For example, as shown in FIG. 2, two receiving plates 121a may be provided to receive one battery module 110. The two receiving plates 121a may be configured to support a lower end portion of the battery module 110 in a left-right direction in an upper direction. In addition, the two receiving plates 121a may serve as a stopper for preventing the other battery module 110 placed below from moving in an upper direction.

Meanwhile, referring back to FIGS. 1 to 3, the front frame 122 may include a plurality of pillar portions 124 extending in the up-down direction. Upper end and lower end portions of the pillar portion 124 may be configured to be coupled to an external object (e.g., bottom or ceiling, or the other rack case 120 (of FIG. 11)). The pillar portion 124 may serve as a main skeleton of the overall shape that is a hexahedron of the rack case 120. For example, as shown in FIG. 1, the front frame 122 may include three pillar portions 124 positioned on the front end of the rack case 120.

In addition, the front frame 122 may include a connection unit 125 connecting upper end portions between the pillar portions 124 in a horizontal direction. For example, as shown in FIG. 2, the connection unit 125 may be configured to connect between the upper end portions of the three pillar portions 124.

The front frame 122 may include a fixing unit 126 connecting lower end portions between the pillar portions 124 in the horizontal direction. For example, as shown in FIG. 2, the fixing unit 126 may be configured to connect between the lower end portions of the three pillar portions 124.

Figure 5:
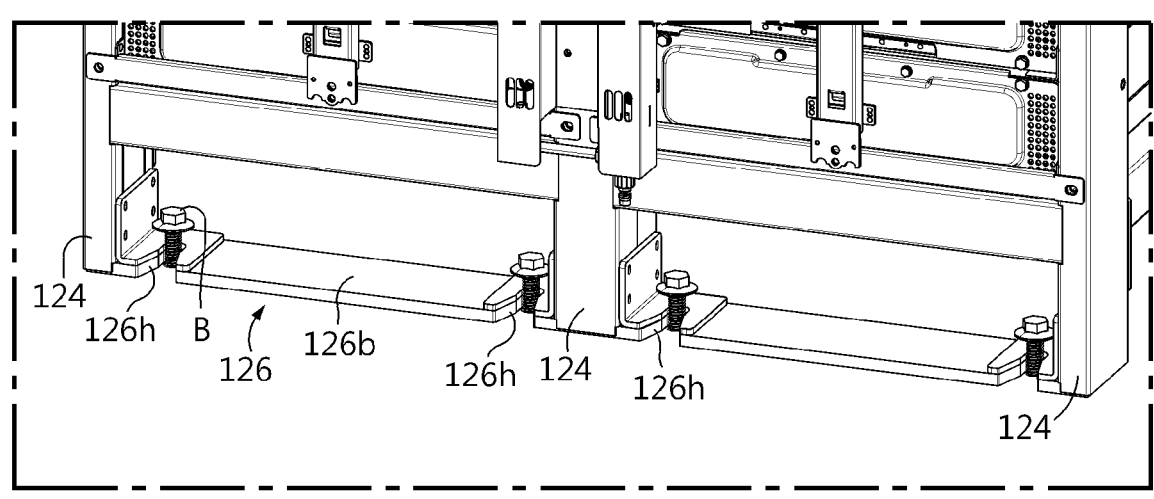
FIG. 5 is a partial perspective view schematically illustrating the rear of the battery rack of FIG. 1.

The rear frame 123 may include the plurality of pillar portions 124 extending in the up-down direction. The pillar portion 124 may serve as a main skeleton of the overall shape that is a hexahedron of the rack case 120. For example, as shown in FIG. 5, the rear frame 123 may include three pillar portions 124 positioned on the rear end of the rack case 120.

Furthermore, the rear frame 123 may include the connection unit 125 connecting upper end portions between the pillar portions 124 in the horizontal direction. For example, as shown in FIG. 2, the connection unit 125 may be configured to connect between the upper end portions of the three pillar portions 124.

The rear frame 123 may include the fixing unit 126 connecting the lower end portions between the pillar portions 124 in the horizontal direction. For example, as shown in FIG. 2, the fixing unit 126 may be configured to connect between the lower end portions of the three pillar portions 124.

FIG. 4 is a partial perspective view schematically illustrating the front of the battery rack of FIG. 1. FIG. 5 is a partial perspective view schematically illustrating the rear of the battery rack of FIG. 1.

FIG. 5 is a partial perspective view schematically illustrating a region A of the battery rack of FIG. 2.

Referring to FIGS. 4 and 5 together with FIG. 2 again, the fixing unit 126 may include the main body part 126b of a plate shape extending in a horizontal direction. For example, the main body part 126b may extend in a horizontal direction to connect lower end portions of the plurality of pillar portions 124. The fixing unit 126 may include the fixing groove 126h formed to be recessed from an edge of the main body part 126b. The fixing groove 126h may have a slit shape such that a body of a bolt B is slide-inserted in the horizontal direction.

For example, as shown in FIG. 4, the fixing unit 126 of front frame 122 may include four fixing grooves 126h recessed rearward from a front end portion of the main body part 126b. For example, as shown in FIG. 5, the fixing unit 126 of the rear frame 123 may include four fixing grooves 126h recessed forward from a rear end portion of the main body part 126b.

That is, in the related art, there could be a case where an operator could not secure a working space to perform a bolting operation at the back of the battery rack in order to fix the battery rack to the bottom.

Meanwhile, according to the present disclosure, the bolt B may be previously fixed to the installation bottom by a predetermined depth, a form in which the bolt B is erected in the upper direction from the ground may be made, and then the battery rack 100 may slide and move rearward so that the body of the bolt B may be inserted into the fixing groove 126h. Then, the operator may tighten the bolt B inserted into the fixing groove 126h using a long bar-shaped spanner at the front of the battery rack 100 so that the rear frame 123 may be fixed to the bottom. More specifically, for example, the bolt B may be previously fixed to the installation bottom of the rear side of the battery rack 100 by a predetermined depth. Thereafter, the battery rack 100 may slide and move rearward and then the bolt B inserted into the fixing groove 126h may be tightened. Accordingly, the position of the battery rack 100 may be fixed. Therefore, the position of the fixing groove 126h on the front side may be determined. Thereafter, the battery rack 100 may be additionally fixed to the installation bottom by inserting the bolt B into the fixing groove 126h provided in the front side of the battery rack 100. Here, a method of fixing the battery rack 100 to the installation bottom has been described, but the method may also be applied to a method of fixing the battery rack 100 to an upper portion of another battery rack 100 as well as the installation bottom.

Therefore, according to such a configuration of the present disclosure, the fixing groove 126h is included in the fixing unit 126 of each of the front frame 122 and the rear frame 123, and thus the battery rack 100 may be stably fixed to the bottom of a storage place. In addition, the present disclosure may stably fix the battery rack 100 to the bottom of a transport device, thereby stably maintaining a fixed state even when an external impact occurs during transport. In addition, present disclosure may facilitate fixing the battery rack 100 to the installation place.

Figure 6:
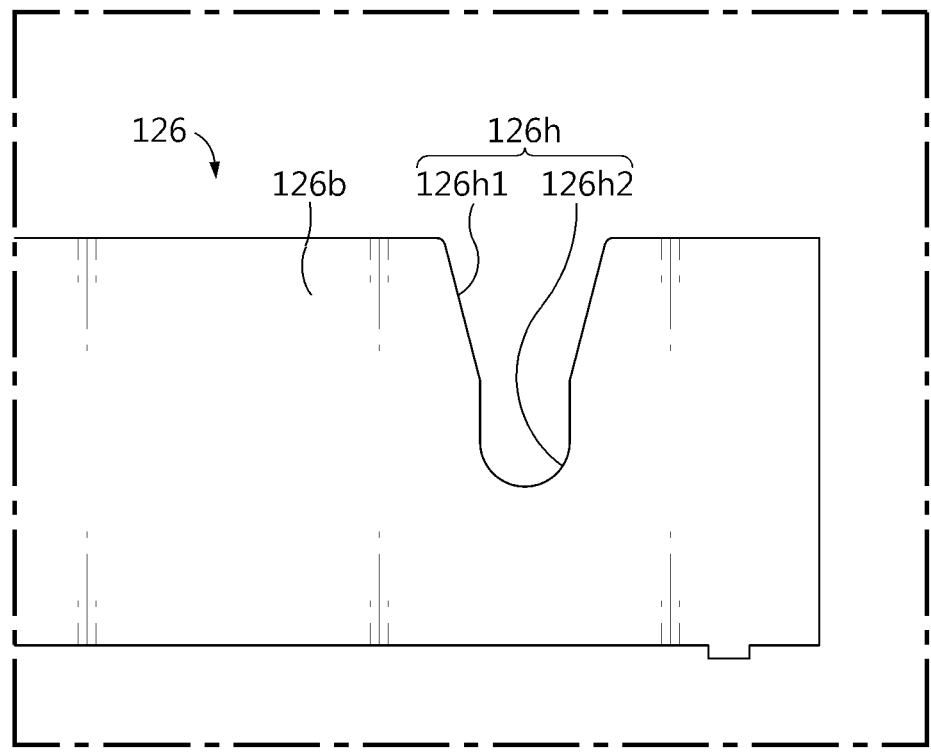
FIG. 6 is a partial plan view schematically illustration a part of a fixing unit of a battery rack according to an embodiment of the present disclosure.

FIG. 6 is a partial plan view schematically illustration a part of the fixing unit of the battery rack according to an embodiment of the present disclosure.

Referring to FIG. 6, the fixing groove 126h of the present disclosure may include a taper portion 126h1 and an accommodation portion 126h2. At least a part of the taper portion 126h1 may have a shape in which the size of the groove is gradually reduced in a recessed direction from an edge of the main body part 126b. The accommodation portion 126h2 may have a space formed to be further recessed in an inside direction from the taper portion 126h1. The accommodation portion 126h2 may have a circular opening. The size of the groove of the taper portion 126h1 may be greater than the size of the body of the bolt B.

For example, as shown in FIG. 6, the fixing groove 126h may include the taper portion 126h1 formed to be recessed rearward from a front end portion. At this time, the taper portion 126h1 may have a shape in which the size of the groove is gradually reduced in the recessed direction from the edge of the main body part 126b. The accommodation portion 126h2 may have the opening in which the body of the bolt B may be accommodated.

Therefore, according to such a configuration of the present disclosure, the present disclosure includes the taper portion 126h1 and the accommodation portion 126h2 in the fixing groove 126h, so that the bolt B may move in a horizontal direction along an inner surface of the taper portion 126h1 of the fixing groove 126h and may be seated in the accommodation portion 126h2. Accordingly, the present disclosure may easily fix the rack case 120 to the bolt B fixed to the bottom through the fixing groove 126h.

Figure 7:
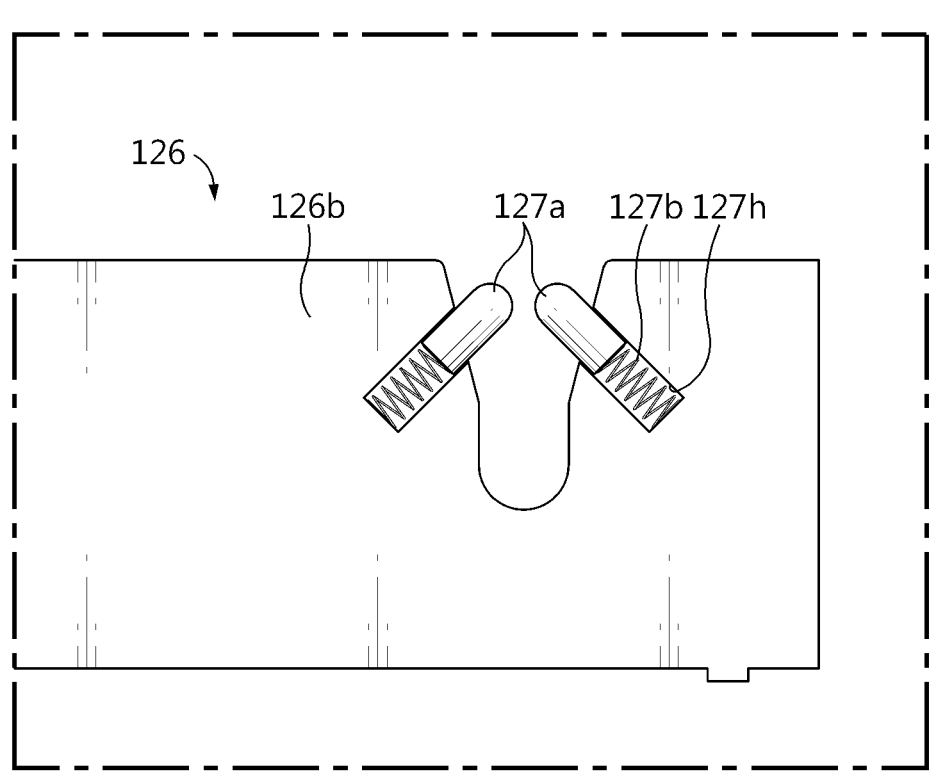
FIG. 7 is a partial plan view schematically illustrating a part of a fixing unit of a battery rack according to another embodiment of the present disclosure.

FIG. 7 is a partial plan view schematically illustrating a part of the fixing unit of the battery rack according to another embodiment of the present disclosure.

Referring to FIG. 7, the fixing unit 126 of the battery rack 100 according to another embodiment of the present disclosure may further include a restraining bar 127a, an accommodation groove 127h, and an elastic member 127b, as compared with the fixing unit 126 of FIG. 6.

Specifically, the restraining bar 127a may be configured to protrude so as to partition between the taper portion 126h1 and the accommodation portion 126h2. The restraining bar 127a may have a bar shape extending in a straight line. For example, as shown in FIG. 7, two restraining bars 127a may be provided in the fixing groove 126h of the fixing unit 126.

Also, the accommodation groove 127h may have an internal space to accommodate at least a part of the restraining bar 127a. For example, as shown in FIG. 7, the fixing groove 126h may include the two accommodation grooves 127h into which at least a part of the two restraining bars 127a is inserted.

Moreover, the elastic member 127b may be provided in the accommodation groove 127h. The elastic member 127b may be configured to pressurize the restraining bar 127a to protrude from the accommodation groove 127h. The elastic member 127b may include, for example, a spring.

Therefore, according to such a configuration of the present disclosure, the present disclosure includes the elastic member 127b configured to make the restraining bar 127a protrude to the outside from the accommodation groove 127h, and thus, when the bolt B is inserted into the fixing groove 126h, the restraining bar 127a may be accommodated in the accommodation groove 127h, and when the bolt B is positioned in the accommodation portion 126h2, the restraining bar 127a may protrude again from the accommodation groove 127h to the outside, thereby very easily achieving a process of fastening the bolt B to the fixing groove 126h. Accordingly, the present disclosure greatly facilitates installation of the battery rack 100.

Figure 8:
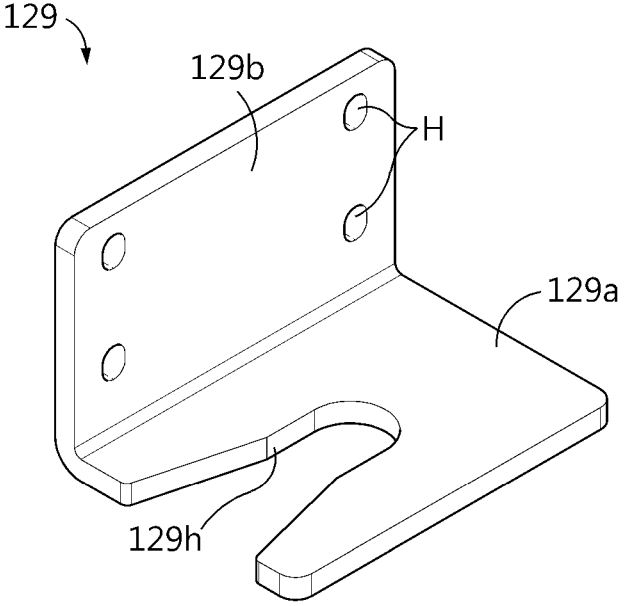
FIG. 8 is a perspective view schematically illustrating a bracket of a battery rack according to an embodiment of the present disclosure.

FIG. 8 is a perspective view schematically illustrating a bracket of the battery rack according to an embodiment of the present disclosure.

Referring to FIG. 8 together with FIGS. 3 and 5 again, the front frame 122 and/or the rear frame 123 of the battery rack 100 according to an embodiment of the present disclosure may include at least one bracket 129.

The bracket 129 may include a mounting unit 129a configured to face one surface of the fixing unit 126 so as to be mounted on the fixing unit 126. The mounting unit 129a may include a slit groove 129h having a shape corresponding to the fixing groove 126h of the fixing unit 126. That is, the slit groove 129h may be configured to be fixed in a state in which a head part of the bolt B is seated.

In addition, the bracket 129 may include a fastening unit 129b configured to be coupled to the pillar portion 124. The fastening unit 129b may have a shape bent and extending in an upper direction from an end portion of the mounting unit 129a. The fastening unit 129b may include a bolt hole so as to be bolt-coupled to the pillar portion 124. For example, as shown in FIG. 8, the bracket 129 may include four bolt holes H configured to be communicatively connected to the bolt hole H of the pillar portion 124.

For example, as shown in FIG. 4, the fixing unit 126 of the front frame 122 may include four brackets 129. For example, as shown in FIG. 5, the fixing unit 126 of the rear frame 123 may include four brackets 129.

Figure 9:
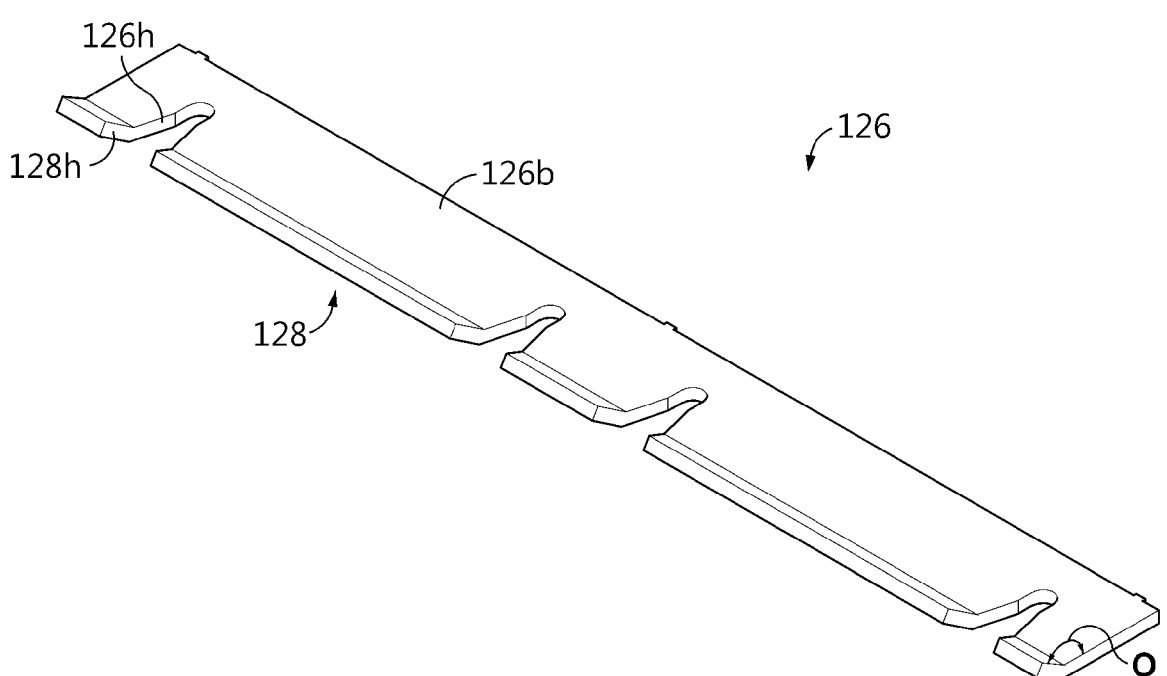
FIG. 9 is a perspective view schematically illustrating a fixing unit of a battery rack according to another embodiment of the present disclosure.

FIG. 9 is a perspective view schematically illustrating the fixing unit of the battery rack according to another embodiment of the present disclosure.

Referring to FIG. 9, the fixing unit 126 of the battery rack 100 according to another embodiment of the present disclosure may further include a guide unit 128 when compared with the fixing unit 126 of FIG. 4.

Specifically, the guide unit 128 may be configured to guide a movement of the fixing unit 126. The guide unit 128 may have a side parallel to the ground at the bottom so as to be movable along the ground. For example, as shown in FIG. 9, the guide unit 128 may be a portion protruding and extending in an outer direction from the edge of the main body part 126b of the fixing unit 126. The guide unit 128 may have a shape bent at a predetermined angle Q from the edge of the main body part 126b. The guide unit 128 may have a shape bent, for example, at an angle of about 30 degrees from the edge of the main body part 126b.

Therefore, according to such a configuration of the present disclosure, the present disclosure may guide the fixing unit 126 to slide and move along the bottom through the guide unit 128.

For example, when the fixing groove 126h is inserted into the bolt B fixed to the bottom in a state where the battery rack 100 is inclined at an angle of 30 degrees with respect to the up-down direction, the guide unit 128 bent at an angle of 30 degrees from the main body part 126b has the side parallel to the ground. Accordingly, the guide unit 128 may easily slide and move the battery rack 100 in the horizontal direction without shaking in the up-down direction while moving along the ground.

In addition, the guide unit 128 may include an extension groove 128h. The extension groove 128h may be formed to be recessed in the inner direction of the body from a protruding edge of the guide unit 128. That is, the extension groove 128h may be configured to be communicatively connected to the fixing groove 126h of the fixing unit 126.

Therefore, according to such a configuration of the present disclosure, the guide unit 128 includes the extension groove 128h, thereby guiding the bolt B to be inserted into the fixing groove 126h formed in the fixing unit 126. That is, the guide unit 128 may guide the bolt B to be first inserted into the extension groove 128h and then move to the fixing groove 126h through the extension groove 128h while moving along the ground. Accordingly, the guide unit 128 of the present disclosure may facilitate the installation of the battery rack 100.

Figure 10:
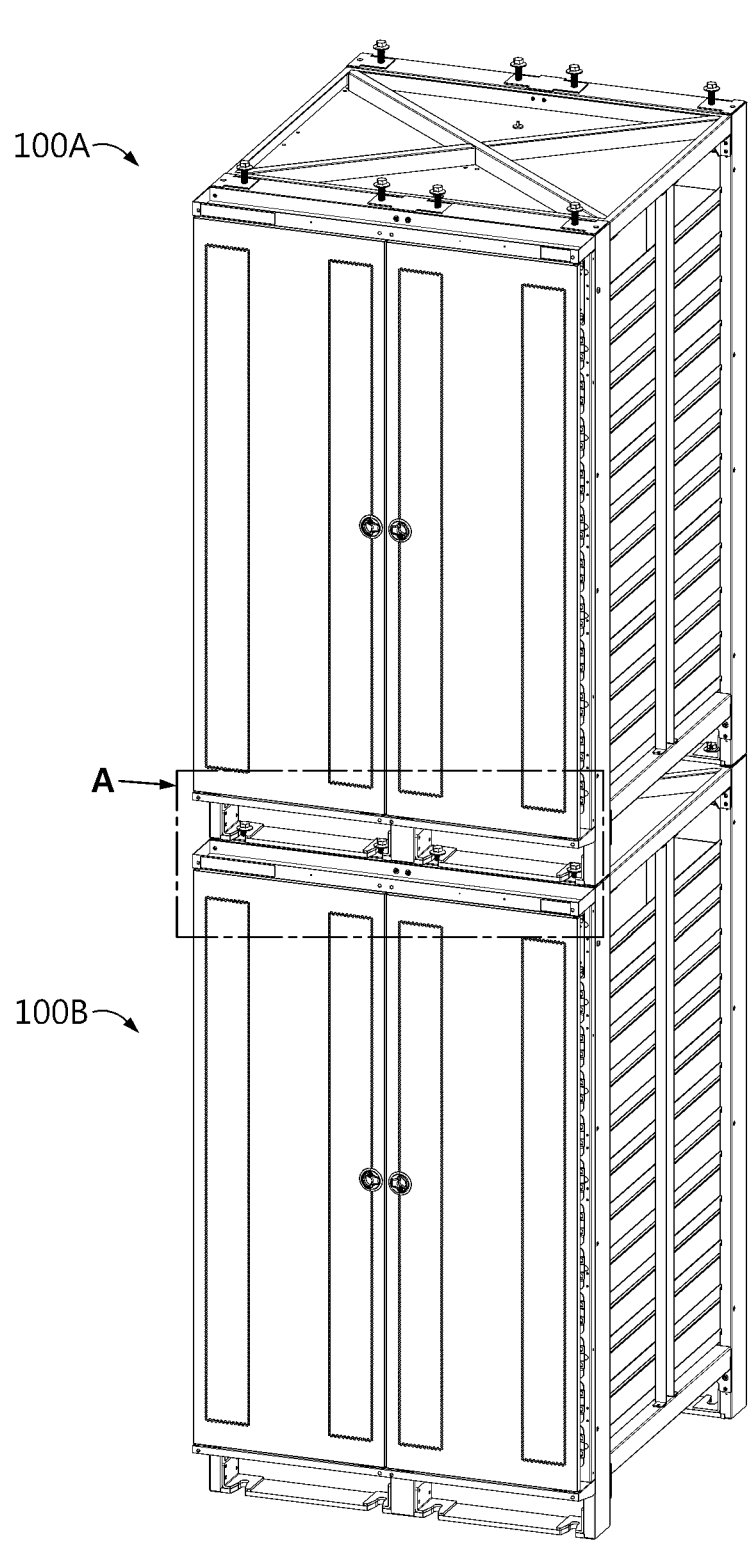
FIG. 10 is a perspective view schematically illustrating an energy storage system according to an embodiment of the present disclosure.

FIG. 10 is a perspective view schematically illustrating an energy storage system according to an embodiment of the present disclosure.

Referring to FIG. 10, the energy storage system 200 according to the present disclosure may include one or more battery racks 100 according to the present disclosure described above. For example, as shown in FIG. 10, the battery rack 100 may include two or more battery racks 100A and 100B according to the present disclosure in a stacked form. The plurality of battery racks 100A and 100B may be electrically connected to each other. The energy storage system 200 according to the present disclosure may be implemented in various forms, such as a smart grid system or an electric charging station.

Figure 11:
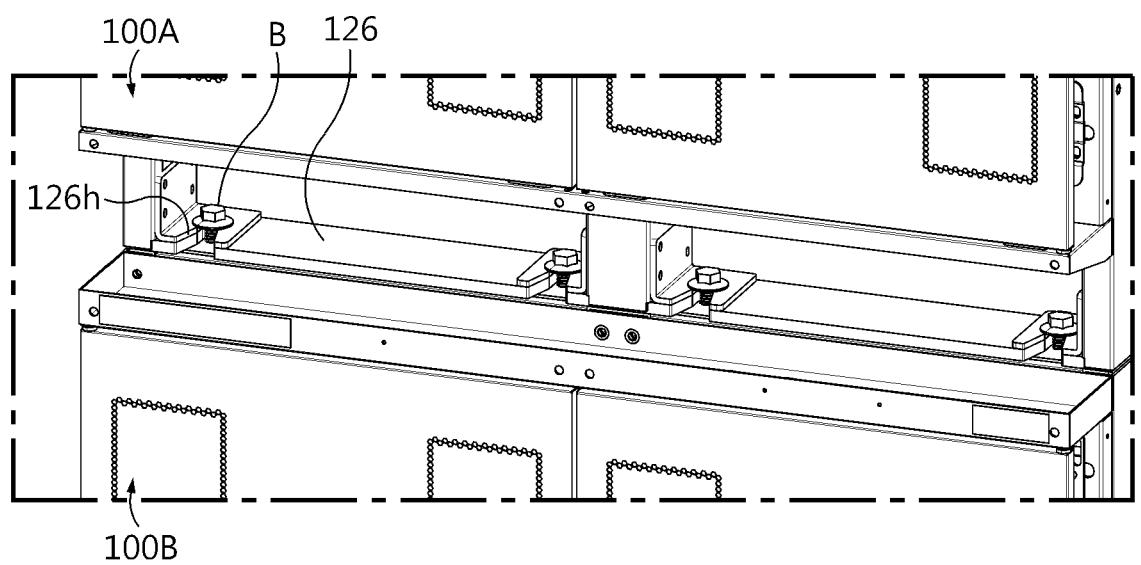
FIG. 11 is a partial perspective view schematically illustrating a region A of the energy storage system of FIG. 10.

FIG. 11 is a partial perspective view schematically illustrating a region A of the energy storage system of FIG. 10.

Referring to FIGS. 10 and 11 together with FIG. 1 again, the energy storage system 200 may include the two or more battery racks 100A and 100B stacked in the up-down direction. Among the stacked two or more battery racks 100A and 100B, the battery rack 100B located relatively below may further include the bolt B. The bolt B may be configured to be inserted into the two or more stacked fixing grooves 126h. The battery rack 100B located relatively below may further include the bolt hole H formed in an upper portion of the rack case 120. For example, the battery rack 100B located relatively below may further include the bolt hole H formed in the connection unit 125 of each of the front frame 122 and the rear frame 123.

For example, as shown in FIG. 1, among the two battery rack 100 stacked in the up-down direction, the battery rack 100B located below may include four bolts B and four bolt holes H in the connection unit 125 of the front frame 122, and may include four bolts B and four bolt holes H in the connection unit 125 of the rear frame 123.

In addition, the bolt B fixed to the bolt hole H may be inserted into the fixing groove 126h of the battery rack 100A located relatively above. For example, as shown in FIG. 11, among the two battery racks 100A and 100B stacked in the up-down direction, the fixing unit 126 of each of the front frame 122 and the rear frame 123 of the battery racks 100A located above may be bolt-fastened to the connection unit 125 of each of the front frame 122 and the rear frame 123 of the battery rack 100B located below. At this time, the bolt B fixed to a bolt hole 125h of the connection unit 125 may slide and move in the horizontal direction to be inserted into the fixing groove 126h of the fixing unit 126.

Therefore, according to such a configuration of the present disclosure, the present disclosure stacks the plurality of battery racks 100 in the up-down direction, fixes the battery rack 100B located below to the ground, and fixes the battery rack 100A located above to the upper portion of the battery rack 100B located below, thereby further utilizing an upper space of the space in which the battery rack 100 of the power storage system 200 is accommodated, thereby effectively increasing the energy density to the space of the power storage system 200.

Moreover, the present disclosure includes the fixing groove 126h in the fixing unit 126 of the battery rack 100, and thus having the advantage of stacking the plurality of battery racks 100 in the up-down direction and easily achieving fixing between the battery racks 100.

Meanwhile, the present disclosure provides a power generation system including at least one battery rack 100. The power generation system may include a hydro power generator, a thermal power generator, a wind power generator, a solar generator, etc. Electricity generated from such a generator may be stored in the battery rack 100.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery rack comprising:
a plurality of battery modules arranged in a first direction; and
a rack case configured to accommodate the plurality of battery modules, wherein the rack case comprises a fixer provided on a lower end portion of the rack case,
wherein the fixer comprises a main body part having a plate shape,
wherein the main body part comprises a fixing groove formed to be recessed in a second direction from an edge of the main body part, and
wherein the fixer comprises:
a restraining bar configured to protrude into the fixing groove; and
an accommodation groove having an internal space to accommodate at least a part of the restraining bar.

2. The battery rack of claim 1, wherein the rack case comprises:
a shelf frame configured to mount the plurality of battery modules;
a front frame coupled to a front end of the shelf frame; and
a rear frame coupled to a rear end of the shelf frame.

3. The battery rack of claim 2, wherein each of the front frame and the rear frame comprises:
a plurality of pillar portions extending in the first direction; and
a connector extending in a horizontal direction to connect upper portions of the plurality of pillar portions, and
wherein the main body part extends in the horizontal direction to connect lower end portions of the plurality of pillar portions.

4. The battery rack of claim 3, wherein each of the front frame and the rear frame comprises a bracket, the bracket comprising:
a horizontal section mounted on the fixer and including a slit groove having a shape corresponding to the fixing groove; and
a vertical section having a shape bent and extending in the first direction from an end portion of the horizontal section and configured to be bolt-fastened to a pillar portion of the plurality of pillar portions.

5. The battery rack of claim 1, wherein the fixing groove comprises:
a taper portion having a width that is gradually reduced in the second direction; and
an accommodation portion further recessed in the second direction from the taper portion.

6. The battery rack of claim 5, wherein the restraining bar is configured to protrude into the fixing groove to partition between the taper portion and the accommodation portion.

7. The battery rack of claim 6, wherein the fixer further comprises an elastic member provided in the accommodation groove and configured to pressurize the restraining bar to protrude from the accommodation groove.

8. The battery rack of claim 1, wherein the fixer further comprises a guide extending outwardly from the edge of the main body part in the second direction so as to guide a movement of the fixer.

9. The battery rack of claim 8, wherein the guide is bent upward at a predetermined angle, and comprises an extension groove formed to be recessed from a protruding and extending edge.

10. An energy storage system comprising at least one battery rack according to claim 1.

11. The energy storage system of claim 10, comprising two or more battery racks stacked in the first direction,
wherein, among the two or more battery racks, a first battery rack located below a second battery rack comprises:
a bolt hole formed in an upper portion of the rack case; and a bolt fixed to the bolt hole, and wherein the bolt fixed to the bolt hole is configured to be inserted into the fixing groove of the second battery rack.

12. A power generation system comprising at least one battery rack according to claim 1.

* * * * *